(12) United States Patent
Jayakumar et al.

(10) Patent No.: US 6,298,410 B1
(45) Date of Patent: *Oct. 2, 2001

(54) APPARATUS AND METHOD FOR INITIATING HARDWARE PRIORITY MANAGEMENT BY SOFTWARE CONTROLLED REGISTER ACCESS (75) Inventors: Muthurajan Jayakumar, Sunnyvale; Vijay Kumar Goru; Ravi Eakambaram, both of San Jose, all of CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/001,817

(22) Filed: Dec. 31, 1997

(51) Int. Cl.[7] .............................. G06F 13/24; G06F 13/26; G06F 13/34
(52) U.S. Cl. .................. 710/266; 710/264; 710/267; 710/261; 710/262; 712/32
(58) Field of Search ..................... 710/113, 261, 710/262, 263, 264, 266, 267, 269, 265, 130, 217; 708/672; 712/32; 713/502

(56) References Cited

U.S. PATENT DOCUMENTS

| 4,365,294 | * | 12/1982 | Stokken | 713/502 |
| 4,604,683 | | 8/1986 | Russ et al. . | |
| 5,384,724 | * | 1/1995 | Jagini | 708/672 |
| 5,446,910 | | 8/1995 | Kennedy et al. . | |
| 5,471,620 | * | 11/1995 | Shimizu et al. | 710/265 |
| 5,481,728 | * | 1/1996 | Matsutani | 710/113 |
| 5,491,828 | | 2/1996 | Intrater et al. . | |

OTHER PUBLICATIONS

PCT/US98/27514, PCT International Search Report.

* cited by examiner

*Primary Examiner*—Daniel H. Pan
(74) *Attorney, Agent, or Firm*—Blakely, Sokoloff, Taylor & Zafamn LLP (57) ABSTRACT An apparatus and method for controlling interrupts in a computer are disclosed, in which programmable software operates to control when data concerning the interrupt having highest priority is to be provided, and hardware logic operates to control how that data is provided. An interrupt vector register is included in the computer CPU. The interrupt vector register does not act like the typical register. It is not a physical register, and cannot be written to. A read to this register by the programmable software, triggers the hardware logic. Once triggered, this logic performs certain control tasks, the end result of which is returning to the programmable software, a vector corresponding to the interrupt having highest priority. The programmable software can implement various software policies, in addition to the hardware policy implemented by the hardware logic.

22 Claims, 4 Drawing Sheets

APPARATUS AND METHOD FOR INITIATING HARDWARE PRIORITY MANAGEMENT BY SOFTWARE CONTROLLED REGISTER ACCESS

BACKGROUND OF THE INVENTION

1. Field of the Invention

This invention relates generally to computers. More particularly, it relates to interrupt controllers for controlling interrupts in a computer.

2. Description of the Related Art

A computer is a machine that essentially does three things. First, it accepts input. Second, it processes the input according to a prescribed set of rules. Third, it produces as output the results of processing the input according to the prescribed set of rules.

To perform these tasks, a computer, in general, includes: an input device, such as a keyboard, that accepts input; and output device, such as a printer or video display, that outputs the results; and a processor, such as a central processing unit (CPU), that does the processing. In present-day personal computers, the CPU might be a microprocessor. Additionally, the computer might have memory. Such memory might be used by the processor to store data. Or the memory might be used to store computer instructions, which instructions were put into the memory in the form of microcode.

While the computer is operating and the processor is processing the input previously received by the computer according to the prescribed set of rules, the processor might receive a request for attention. For example, the processor might receive a request from the keyboard to accept new input. Such a request for attention is called an interrupt.

In general, when the processor receives an interrupt it suspends its current operations, saves the status of its work, and transfers control to a special routine which contains the instructions for dealing with the particular situation that caused the interrupt. Interrupts might be generated by various hardware devices to request service or to report problems, or by the processor itself in response to program errors or requests for operating system services. Interrupts are the processor's way of communicating with the other elements that make up the computer system. A hierarchy of interrupt priorities determines which interrupt request will be handled first, if more than one request has been made. Particular programs can temporarily disable some interrupts, when the program needs the full attention of the processor to complete a particular task.

In general, an interrupt can be considered a feature of a computer that permits the execution of one program to be interrupted in order to execute another program. That other program might be a special program that is executed when a specific interrupt occurs, sometimes called an interrupt handler. Interrupts from different causes have different handlers to carry out the corresponding tasks, such as updating the system clock or reading the keyboard. A table stored in memory contains pointers, sometimes called address vectors, that direct the processor to the various interrupt handlers. Programmers can create interrupt handlers to replace or supplement existing handlers. Alternatively, that other program might be one that takes place only when requested by means of an interrupt, sometimes called an interrupt-driven process. After the required task has been completed, the CPU is then free to perform other tasks until the next interrupt occurs. Interrupt driven processors sometimes are used to respond to such events as a floppy-disk drive having become ready to transfer data.

In general, computers include a hardware line, sometimes called an interrupt request line, over which devices such as a keyboard or a disk drive can send interrupts to the CPU. Such interrupt request lines are built into the computer's internal hardware, and are assigned different levels of priority so that the CPU can determine the sources and relative importance of incoming service requests.

The manner in which a particular computer deals with interrupts, is determined by the computer's interrupt controller. Early interrupt controllers were hard-wired in the computer. As such, their operation was fixed by the computer manufacturer, and could not be altered.

In certain sophisticated modern microprocessors, such as the PentiumPRO™ microprocessor manufactured by Intel, an advanced programmable interrupt controller is included in the CPU. This advanced programmable interrupt controller, referred to as APIC, is programmable. From a programmer's point of view, however, the APIC is viewed as an add-on because the APIC registers, even though they reside in the CPU, are accessed as a memory mapped device. That is, these APIC registers are written to, and read from, under the control of microcode, in the same manner as memory containing data or instructions.

The present invention provides a streamline advanced programmable interrupt controller (SAPIC) having an interrupt vector register (IVR) located in the CPU, which is not treated like computer memory, and which does not need microcode for control. The present invention eliminates the need for microcode for the interrupt controller, thereby eliminating the need for a costly on-chip read only memory (ROM) to carry that microcode. As a result, the portion of the chip formally devoted to such a microcode ROM can be used to implement more intelligent logic, thereby giving the chip maker a greater return on investment.

Nearly all known prior art programmable interrupt controllers are controlled by microcode. The microcode is coded by the microprocessor manufacturer, and thereafter cannot readily be changed by programmers to better meet the needs of, for example, a particular computer operating system. Consequentially, programmers cannot readily change the way in which interrupt control is carried out in the computer.

In the remaining known prior art devices, microprocessor manufacturers have implemented the entire interrupt management for the CPU in software, with no hardware implementation whatsoever. While this has eliminated interrupt controller microcode and the ROM to store such code, and does permit programmers to make changes to the control software, this approach has numerous disadvantages. For example, this approach results in more code that has to be executed by the processor every time an interrupt is encountered, thereby increasing the latency of interrupt servicing.

The present invention provides a more optimum solution, and is directed to overcoming, or at least reducing, the effects of one or more of the problems mentioned.

SUMMARY OF THE INVENTION

In one aspect of the present invention, a register-based programmable interrupt controller is provided for controlling interrupts in a computer. The controller includes programmable software located in the CPU that controls when the pending interrupt having highest priority is provided, and hardware interrupt logic that controls how that pending highest priority interrupt is provided.

An interrupt vector register is included in the CPU. This register, however, does not act like the typical register. It is not a physical register, and cannot be written to. A read to this register, by the programmable software, triggers the hardware interrupt logic; once triggered, this logic performs certain control actions, the end result of which is returning to the programmable software a vector corresponding to the interrupt having highest priority. Thus the programmable software performs a read operation, and receives back data; that data, however, does not come from the register being read, but rather is generated by the hardware interrupt logic.

Known prior art devices have two types of registers: registers which have no side effect; and registers which have a side effect when a write is issued to the register. No known prior art registers perform a control activity, such as the priority management activity of the present invention, when a read is issued to the register.

According to an aspect of the present invention, the control actions performed by the hardware interrupt logic include determining if a non-maskable interrupt is present and, if so, returning to the programmable software an indication of that. If a non-maskable interrupt is not present, and if interrupts have been disabled or the interrupt having highest priority is being serviced, a special vector, called a spurious vector, is returned to the programmable software. If a non-maskable interrupt is not present, and if interrupts have not been disabled or the interrupt having highest priority is not being serviced, the vector corresponding to the interrupt having highest priority is returned to the programmable software. The spurious vector is a special vector that is used to tell the processor to keep on doing what it has been doing.

According to another aspect of the present invention, the interrupt vector register is the only register, which when read, triggers a series of control activities in the CPU interrupt priority scheme, and returns the data that is the result of those control activities. The present invention is register-based, not memory-mapped, and provides higher performance than that of a memory-mapped system.

According to yet another aspect of the present invention, the programmable software can be used to flexibly manage interrupt priority: it is programmed to assign vector numbers, each having a particular priority, to devices communicating with the processor, and that program can readily be changed. The present invention does not depend on the presence of microcode, requires less complex hardware, and gives more control to software.

The micro-architecture pipeline, that performs the control activity of the present invention, requires no hand-shake operation, and can perform in synchronism with the CPU. This results in better performance and reliability. The programmable software feature of the present invention provides flexibility, and permits centralized interrupt routines which will read the interrupt vector register and that can implement various software policies in addition to the hardware policy implemented in the hardware interrupt logic. These and other benefits will become evident as the present invention is described more fully below.

BRIEF DESCRIPTION OF THE DRAWINGS

Other objects and advantages of the invention will become apparent upon reading the following detailed description and upon reference to the drawings in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
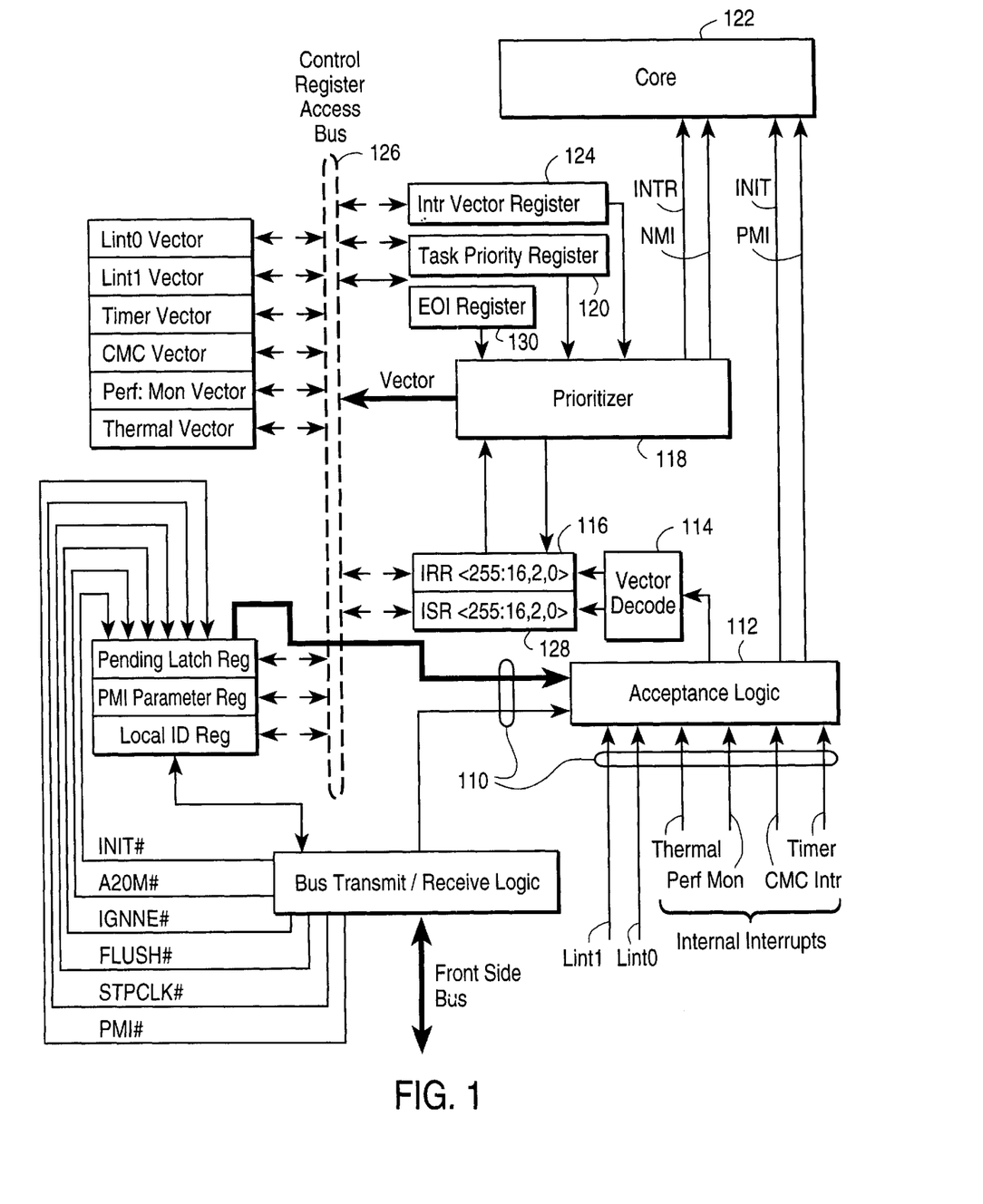
FIG. 1 is a schematic block diagram of a programmable interrupt controller according to the present invention.

Referring now to the drawings, and in particular to FIG. 1, there is shown in block diagram form the basic internal structure of a programmable interrupt controller according to the present invention. Interrupts 110 from different sources are received by the programmable interrupt controller, are prioritized, and are then dispatched to the CPU core 122. Each interrupt is received by acceptance logic 112. The acceptance logic 112 looks at the interrupt, and schedules it if it satisfies basic interrupt criteria, such as masking etc. The interrupt is then decoded by a vector decoder 114, and then assigned to a particular location in Interrupt Request Register (IRR) 116.

By latching a particular interrupt in the Interrupt Request Register (IRR) 116, the programmable interrupt controller registers that interrupt. The interrupt is then sent to a prioritizer 118, where the incoming interrupt is then compared to an already existing interrupt and/or to the Task Priority Register (TPR) 120. An indication that an interrupt is awaiting service is sent to the microprocessor core 122.

In response to the indication that an interrupt is awaiting service, programmable software performs a read operation to the Interrupt Vector Register (IVR) 124, via the Control Register Access Bus (CRAB) 126.

What has been described thus far, is the interrupt acknowledge sequence of the programmable interrupt controller, according to one embodiment of the present invention. After the interrupt has been acknowledged, the programmable interrupt controller responds.

The programmable interrupt controller, according to the embodiment illustrated in FIG. 1, responds to this read by placing the vector of the interrupt on the CRAB bus 126. The core 122 receives the vector from the CRAB bus 126, and enters an interrupt service routine based on the vector received.

The read to the Interrupt Vector Register (IVR) 124 causes the interrupt to move from the Interrupt Request Register (IRR) 116 to the Interrupt Service Register (ISR) 128. When the core 122 is done with the interrupt service routine, it writes to the End of Interrupt (EOI) register 130. This results in the programmable interrupt controller throwing away the interrupt contained in the Interrupt Service Register (ISR) 128, returning the Interrupt Service Register 128 back to its initial state.

Thus far, the processing of a single interrupt has been described. In operation, as many as 242 interrupts can be serviced in the illustrated embodiment of the present invention, providing the operating system allows for multiple-nesting interrupts. And, there could be as many as 242 pending interrupts.

In operation, the programmable software determines the current highest priority pending interrupt vector, by reading the Interrupt Vector Register (IVR) 124. In one embodiment of the present invention, the IVR 124 is in an 8-bit register, and each interrupt is an 8-bit vector containing the number assigned to a particular interrupt source by the programmable software, the programmable software having been programmed to associate a particular priority to each vector number and, thus, to each interrupt source. One particular number is reserved to indicate the present of a spurious vector, described more fully below.

Registers visible to the external world in the embodiment illustrated in FIG. 1, include the End of Interrupt (EOI) register 130, the Interrupt Request Register (IRR) 116, the Interrupt Vector Register (IVR) 124, and the Task Priority Register (TPR) 120. Registers not visible to the external world include the Interrupt Service Register (ISR) 128, the Highest Priority Interrupt Register, and the Highest Servicing Interrupt Register.

The End of Interrupt register (EOI) 130 is actually a pseudo-register. Upon completion of the interrupt handler routine for the highest priority pending interrupt, software is responsible for performing a write operation to the address of the EOI register 130 to clear a particular bit (in the Interrupt Service Register 128 ) associated with the interrupt. Within the programmable interrupt controller, this write asserts a single signal which is then driven through the machine to inform that the interrupt has been completed. In operation, a write to the End of Interrupt register 130 indicates that the software is ready to accept another interrupt at the same or lower priority level, as determined by the Task Priority Register 120. In one embodiment of the present invention, the End of Interrupt register 130 in an 8-bit register.

The Interrupt Request Register (IRR) 116 keeps track of the pending interrupts. A pending interrupt is one that has been accepted, but not yet serviced, by the processor. When an interrupt is received, it will be registered in the IRR 116. When the Interrupt Vector Register 124 is read, the interrupt having the highest priority in the IRR 116 is encoded and supplied as the interrupt vector. Once the vector information is forwarded to the processor, the interrupt will be moved to the Interrupt Service Register 128. In one embodiment of the present invention, the Interrupt Request Register 116 is a 242-bit register.

The Interrupt Service Register (ISR) 128 keeps track of the interrupts that are currently being serviced by the processor. When the Interrupt Vector Register 124 is read, the highest priority pending interrupt vector will be given to the CPU 122, and the corresponding ISR bit will be set. The bit will remain set until the End of Interrupt register 130 is written to by the processor 122. The ISR register 128 may have multiple bits set if higher priority interrupts are accepted during servicing of a lower priority interrupt. These higher priority interrupts will be nested, and serviced, within servicing of the original interrupt. In one embodiment of the present invention, the Interrupt Service Register 128 is a 242-bit register.

The Highest Priority Interrupt Register is used to hold the value of the Highest Priority Interrupt (HPI). In one embodiment of the present invention, this register is an 8-bit register. The Highest Priority Interrupt (HPI) is the vector for the highest priority interrupt that has been received and not serviced.

The Highest Servicing Interrupt Register keeps track of the priority of the interrupt currently being serviced, and is used to hold the value of the Highest Servicing Interrupt (HSI). In one embodiment of the present invention, this register is an 8-bit register. The Highest Servicing Interrupt (HSI) is the vector for the highest priority interrupt being serviced.

The Task Priority Register (TPR) 120 tracks the priority of the processor 122. Processor priority may change each time the processor 122 switches tasks, the processor's current task raises or lowers it priority, the processor 122 enters an interrupt handler, or the processor 122 returns from an interrupt handler, priority being controlled by the programmable software. In the illustrated embodiment, the Task Priority Register 120 is an 8-bit register, providing up to 256 distinct priorities. In one embodiment of the present invention, 242 distinct priorities are used, and the remaining vectors are reserved, as described more fully below.

In the illustrated embodiment, if a particular bit is set in the Task Priority Register (TPR) 120 to indicate that a non-maskable interrupt is present, then a Non-Maskable Interrupt (NMI) indication is sent to the core 122.

Eight bits correspond to 256 distinct binary numbers. These 256 numbers are used in one embodiment of the present invention to assign priority to the interrupts. The hierarchy of priority in one embodiment is: 2; 0; 255, 254, 253, . . . , 16, with the numbers 15 to 3 and 1 being reserved. This means that the number 2 has the highest priority, followed by the number 0, followed by the number 255, followed by the number 254, and downward to the number 16, the number 16 being the number having lowest priority. The number 2 is used to indicate a Non-Maskable Interrupt (NMI), the number 0 is used to indicate an external interrupt, and the remaining 240 numbers are available for assignment to various interrupt sources.

The last-mentioned 240 numbers are used as the vector number for each interrupt, and thus there are 240 interrupt vectors, each corresponding to a particular interrupt source. Consequently, in total there are 242 vectors which are programmable by software, and their range is 255–16, 2, 0.

In one embodiment of the present invention, the above-mentioned possible 256 binary numbers are grouped into 16 groups. Each group is called a class; for example, class 0 contains the numbers 0 to 15, class 1 contains the numbers 16 to 31, class 2 contains the numbers 32 to 47, and so forth, to class 15 which contains the numbers 240 to 255. With this scheme, the 240 vector numbers (that is, all vector numbers except 2 and 0) are contained in classes 1 through 15, and the interrupt vectors contained within a particular class can be treated together for certain purposes. For example, if the highest interrupt being serviced is in class 13 (vector numbers 208–244), and while that interrupt is being serviced another interrupt is received, for that newly received interrupt to have a priority higher than the interrupt currently being serviced, it must be in class 13 or in a higher priority class, classes 14 or 15, or must be a Non-Maskable Interrupt, or an external interrupt; if it is in classes 1 to 12, its priority is lower than that of the interrupt currently being serviced. The Task Priority Register will disable (e.g., mask) interrupts in classes 1 to 12 to speed processing of the interrupt in class 13.

With the above scheme, then, the Highest Priority Interrupt (HPI) is the vector number or value of the interrupt vector for the received and not serviced interrupt having highest priority, and the Highest Servicing Interrupt (HSI) is the vector number or value of the interrupt vector for the highest priority interrupt being serviced. Larger numbers have higher priority values (excluding vector numbers 2 and 0) in one embodiment of the present invention.

Figure 2:
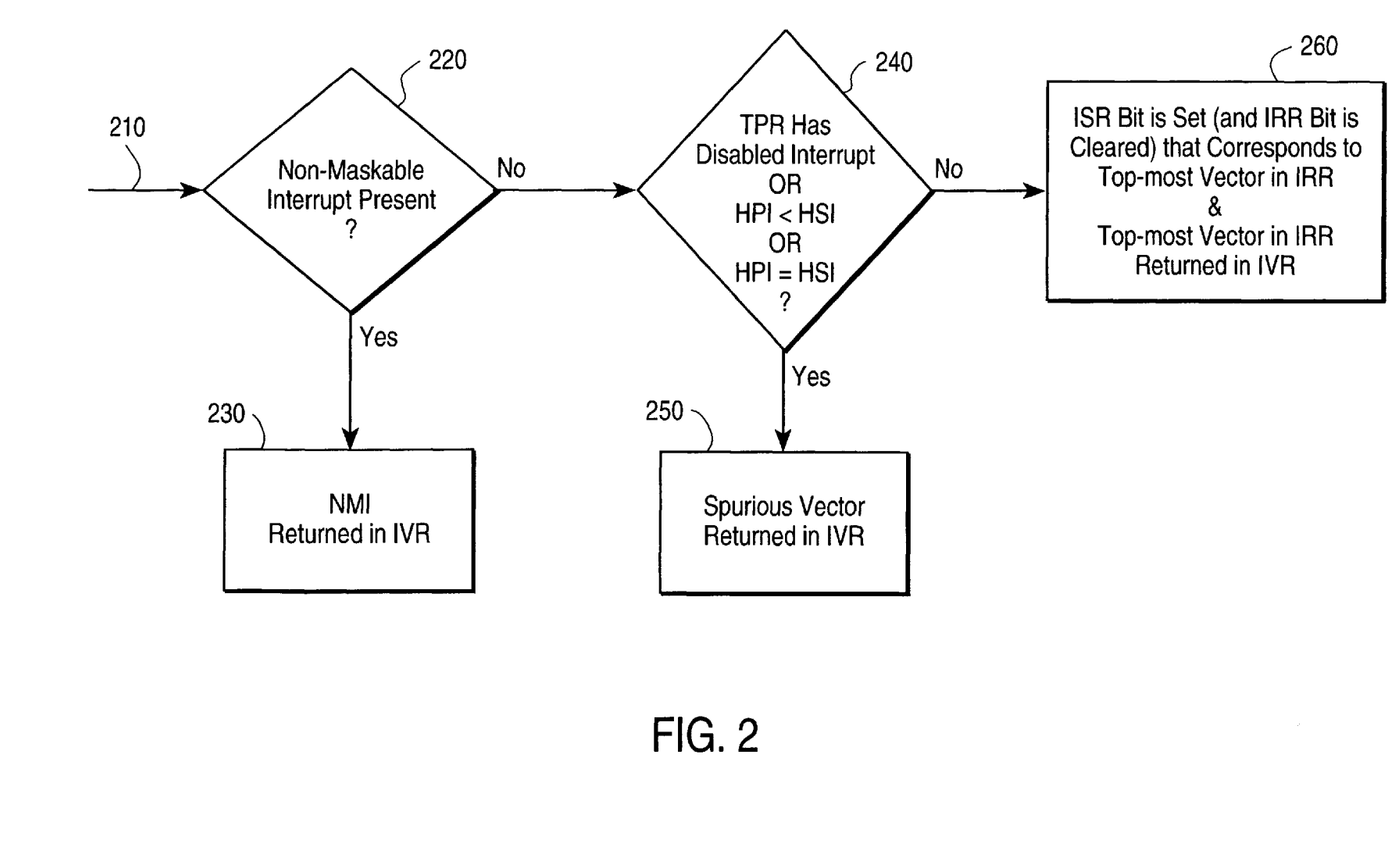
FIG. 2 is a logic flow chart of the control actions performed by the hardware interrupt logic, according to one embodiment of the present invention.

FIG. 2 illustrates certain logic flow of a programmable interrupt controller according to one embodiment of the present invention. The logic is entered via the line 210. The diamond-shaped boxes 220 and 240 are decisions to be made, and the rectangular boxes 230, 250, and 260 are the tasks completed as a result of the outcomes of the decisions made.

FIG. 2 illustrates the control actions that are triggered, when the Interrupt Vector Register FIG. 2 illustrates the control actions that are triggered, when the Interrupt Vector Register (IVR) 124 is read by the programmable software. These control actions, according to the present invention, are implemented in hardware. The first illustrated control action is determining whether a non-maskable interrupt is present (the decision block 220). If a non-maskable interrupt is present, it is returned to the programmable software in the interrupt vector register (VR) 124 (the process block 230). If, on the other hand, a non-maskable interrupt is not present, then the decision block 240 is entered. The decision is made whether the Task Priority Register (TPR) 120 has disabled the interrupts present, or, whether the Highest Pending Interrupt (HPI) is less than, or equal to, the Highest Servicing Interrupt (HIS). If the result of the decision block 240 is yes, then the spurious vector is returned in IVR 124 (process block 250). In one embodiment of the present invention, vector number 15 is reserved as the spurious vector.

With respect to decision block 240, note that HPI might equal HSI because, in operation, an interrupt source might send an interrupt to the controller while the controller is in the process of service an interrupt previously received from that device, or more than one interrupt source might be programmed with the same interrupt vector.

If the outcome of the decision block 240 is no, that is, if TPR 120 has not disabled the interrupts present and HPI>HIS, then the Interrupt Service Register (ISR) bit corresponding to the highest priority interrupt, which in one embodiment of the present invention is the top-most vector in the Interrupt Request Register (IRR) 116, is set, the Interrupt Request Register bit corresponding to the highest priority interrupt is cleared, and the top-most vector (the vector for the highest priority interrupt) in the Interrupt Request Register (IRR) 116 is returned in IVR 124.

Thus the programmable software, located in the CPU as part of the operating system, controls when the vector for the pending interrupt having highest priority is to be provided to the programmable software, and the hardware interrupt logic controls how that vector is provided to the programmable software. A read, by the programmable software, to the Interrupt Vector Register, triggers the control actions of the hardware interrupt logic, which results in the hardware interrupt logic returning data to the programmable software. It is as if the programmable software actually reads information contained in the interrupt vector register when, in reality, the read triggers hardware to determine data and then to return that data to the software. No actual reading or writing in the traditional sense occurs.

Figure 3:
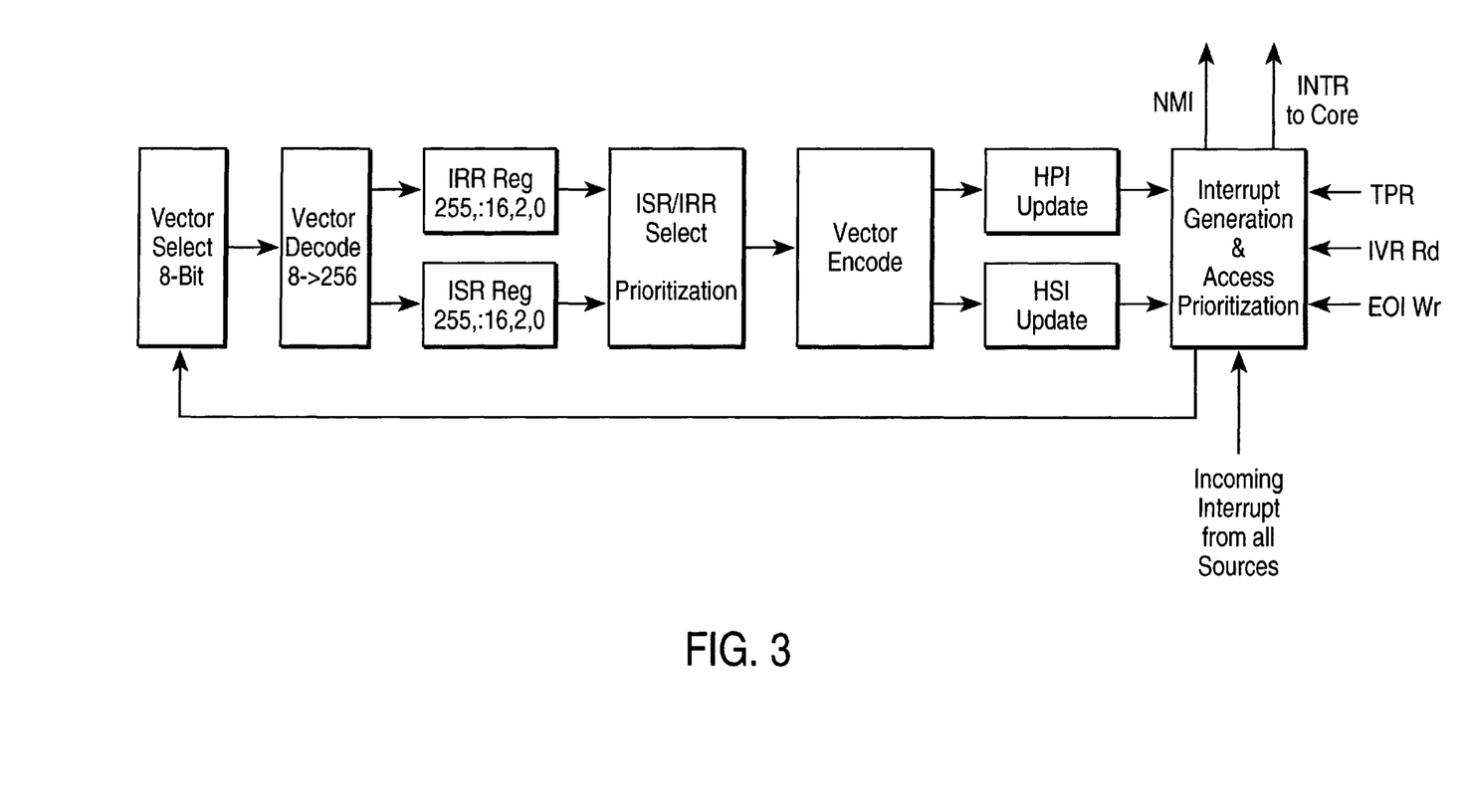
FIG. 3 is a data flow diagram according to an embodiment of the present invention.
Figure 4:
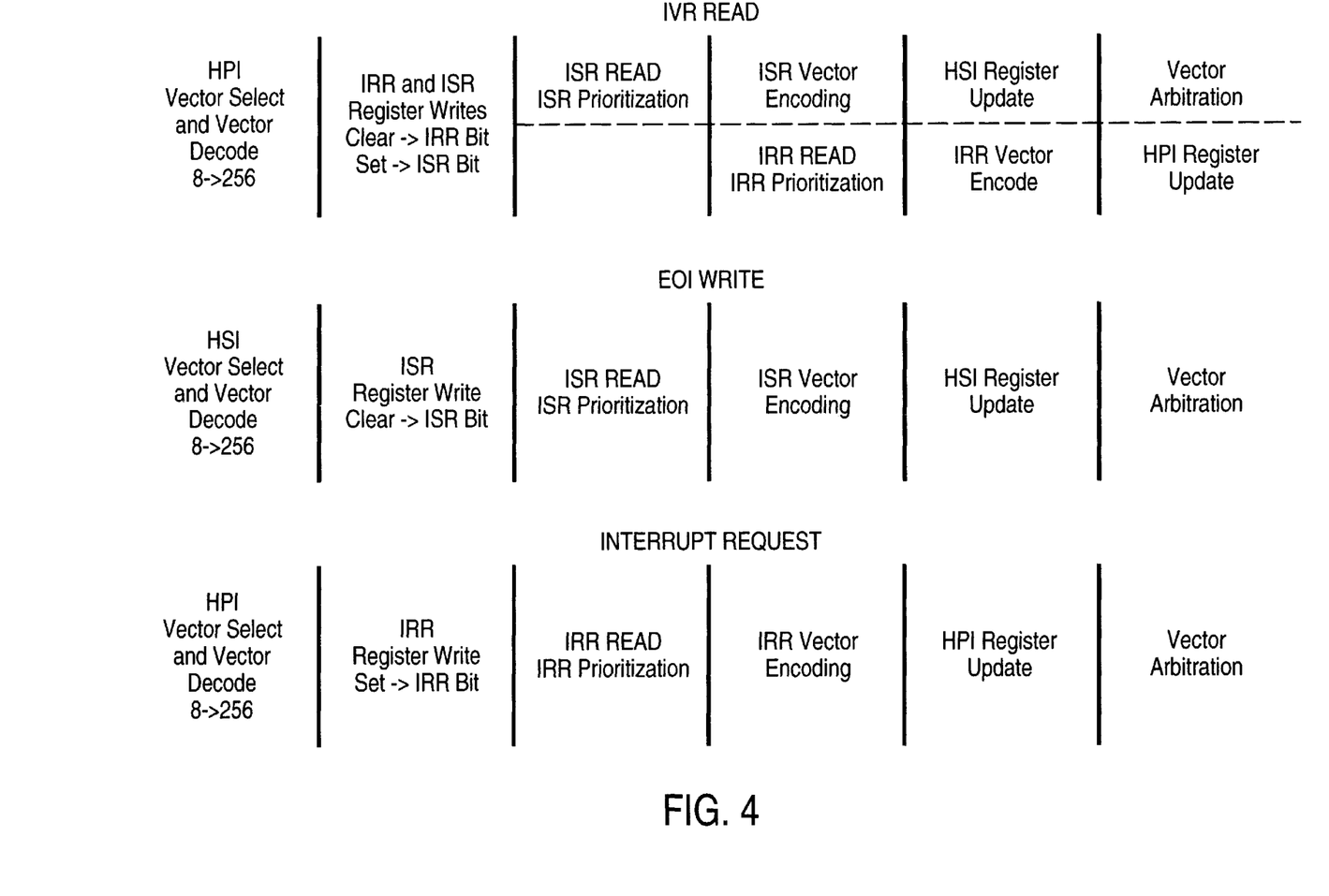
FIG. 4 illustrates various pipelines in an embodiment of the present invention.

FIG. 3 illustrates, in block diagram form, the data flow in the Interrupt Request Register (IRR) 116 and in the Interrupt Service Register (ISR) 128 of one embodiment of the present invention, on a read of the Interrupt Vector Register (IVR) 124 and on a write to the End of Interrupt (EOI) register 130. And, FIG. 4 illustrates the pipeline for an Interrupt Vector Register (IVR) 124 read, for an End of Interrupt (EOI) write, and for an Interrupt Request, for the embodiment illustrated in FIG. 3.

The programmable software that reads the Interrupt Vector Register (IVR) 124 can implement various software policies, in addition to the hardware policy implemented by the hardware interrupt logic. This feature of the present invention permits great flexibility, and permits the interrupt architecture to be tailored to suit the individual needs of various operating systems.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. An apparatus for providing interrupt control comprising:
    a first register for holding an interrupt vector; and
    an interrupt logic circuit coupled to said first register for performing a hardware interrupt sequence when an interrupt is to be processed by software, the hardware interrupt sequence is initiated when the software performs a read to said first register, in which said interrupt logic circuit determines interrupt priority and returns a prioritized vector to said first register; and
    a second register coupled to said interrupt logic circuit to store pending interrupts which have not been serviced, said second register having stored therein priority associated with the pending interrupts and said interrupt logic circuit returning a vector of an interrupt of a selected priority to said first register in response to the hardware interrupt sequence initiated by the software.

2. The apparatus of claim 1 further comprising a second register coupled to said interrupt logic circuit to store pending interrupts which have not been serviced, said second register having stored therein priority associated with the pending interrupts and said interrupt logic circuit returning a vector of an interrupt of a selected priority to said first register in response to the hardware interrupt sequence initiated by the programmable software.

3. The apparatus of claim 1, wherein said interrupt logic circuit determines if a non-maskable interrupt is present and if the non-maskable interrupt is present, returning the non-maskable interrupt to said first register;
    else if the non-maskable interrupt is not present, then said interrupt logic circuit determines if interrupts have not been disabled or if an interrupt having a selected priority is not being serviced, and returning a vector corresponding to the selected priority interrupt to said first register; and if interrupts have been disabled or if the interrupt having the selected priority is being serviced, returning a special vector to said first register.

4. A register-based interrupt controller comprising:

an interrupt vector register for holding an interrupt vector; and an interrupt logic circuit coupled to said interrupt vector register for performing a hardware interrupt sequence when an interrupt is to be processed by software, the hardware interrupt sequence is initiated when the software performs a read to said interrupt vector register, in which said interrupt logic circuit determines interrupt priority and returns a vector of a highest priority to said interrupt vector register, wherein said interrupt logic circuit determines if a non-maskable interrupt is present and if the non-maskable interrupt is present, returning the non-maskable interrupt to said interrupt vector register; else if the non-maskable interrupt is not present, then said interrupt logic circuit determines if interrupts have not been disabled or if an interrupt having the highest priority is not being serviced, and returning a vector corresponding to the highest priority interrupt to said interrupt vector register.

5. The interrupt controller of claim 4 wherein said interrupt logic circuit determines if a non-maskable interrupt is present and if the non-maskable interrupt is present, returning the non-maskable interrupt to said interrupt vector register;

else if the non-maskable interrupt is not present, then said interrupt logic circuit determines if interrupts have not been disabled or if an interrupt having the highest priority is not being serviced, and returning a vector corresponding to the highest priority interrupt to said interrupt vector register.

6. The interrupt controller of claim 5 wherein said interrupt logic circuit also returns a spurious vector to said interrupt vector register if interrupts have been disabled or if an interrupt having the highest priority is being serviced.

7. The interrupt controller of claim 6 further comprising an interrupt request register coupled to said interrupt logic circuit to store pending interrupts which have not been serviced, said interrupt request register having stored therein priority associated with the pending interrupts and said interrupt logic circuit returning a vector of an interrupt of the highest priority to said interrupt request register in response to the hardware interrupt sequence initiated by the software.

8. A programmable interrupt controller for controlling interrupts in a computer comprising:

an interrupt vector register for holding an interrupt vector; and an interrupt logic circuit coupled to said interrupt vector register for performing a hardware interrupt sequence when an interrupt is to be processed by software, the hardware interrupt sequence is initiated when the software performs a read to said interrupt vector register, in which said interrupt logic circuit determines interrupt priority and returns a prioritized vector to said interrupt vector register, wherein said interrupt logic circuit determines if a non-maskable interrupt is present and if the non-maskable interrupt is present, returning the non-maskable interrupt to said interrupt vector register; else if the non-maskable interrupt is not present, then said interrupt logic circuit determines if interrupts have not been disabled or if an interrupt having a selected priority is not being serviced, and returning a vector corresponding to the selected priority interrupt to said interrupt vector register.

9. The interrupt controller of claim 8, wherein said interrupt logic circuit determines if a non-maskable interrupt is present and if the non-maskable interrupt is present, returning the non-maskable interrupt to said interrupt vector register;

else it the non-maskable interrupt is not present, then said interrupt logic circuit determines if interrupts have not been disabled or if an interrupt having a selected priority is not being serviced, and returning a vector corresponding to the selected priority interrupt to said interrupt vector register.

10. The interrupt controller of claim 9 wherein said interrupt logic circuit also returns a spurious vector to said interrupt vector register, if interrupts have been disabled or if the interrupt having the selected priority is being serviced.

11. The interrupt controller of claim 9 further comprising an interrupt request register coupled to said interrupt logic circuit to store pending interrupts which have not been serviced, said interrupt request register having stored therein priority associated with the pending interrupts and said interrupt logic circuit returning a vector of an interrupt of the selected priority to said interrupt request register in response to the hardware interrupt sequence initiated by the software.

12. In a processing device, a programmable interrupt controller comprising:

an interrupt vector register for holding an interrupt vector;

an interrupt logic circuit coupled to said interrupt vector register for performing a hardware interrupt sequence when an interrupt is to be processed by software, the hardware interrupt sequence is initiated when the software performs a read to said interrupt registers, in which said interrupt logic circuit determines interrupt priority and returns a prioritized vector to said interrupt vector register;

an interrupt service register for storing therein a vector of an interrupt being service; and an interrupt request register coupled to said interrupt vector register and said interrupt service register and having stored therein priority associated with pending interrupts.

13. The interrupt controller of claim 12, wherein said interrupt logic circuit determines if a non-maskable interrupt is present and, if the non-maskable interrupt is present, returning the non-maskable interrupt to said interrupt vector register;

else if the non-maskable interrupt is not present, then said interrupt logic circuit determines if interrupts have not been disabled or if an interrupt having a highest priority is not being serviced, and sets an interrupt service register bit corresponding to top-most vector in the interrupt request register, and returns the top-most vector in the interrupt request register.

14. The interrupt controller of claim 12 wherein said interrupt vector register is an x-bit register;

said interrupt service register is a y-bit register; and said interrupt request register is a y-bit register;

wherein x is less than y.

15. The interrupt controller of claim 12 wherein said interrupt vector register is an 8-bit register.

16. The interrupt controller of claim 15 wherein:

said interrupt service register is a 242-bit register; and said interrupt request register is a 242-bit register.

17. A method for controlling interrupts in a computer comprising:

determining if a non-maskable interrupt is present;

returning in an interrupt vector register a non-maskable interrupt when the interrupt vector register is read by programmable software, if the non-maskable interrupt is present;

if a non-maskable interrupt is not present, but if interrupts have been disabled or if an interrupt having highest priority is being serviced, returning in the interrupt vector register a first vector when the interrupt vector register is read by the programmable software; and if a non-maskable interrupt is not present, and if interrupts have not been disabled or if the interrupt having highest priority is not being serviced, returning in the interrupt vector register a vector for the interrupt having highest priority when the interrupt vector register is read by the programmable software.

18. A method for control of interrupts in a computer, comprising:

triggering control action by having software read an interrupt vector register;

determining if a non-maskable interrupt is present;

returning to the interrupt vector register the non-maskable interrupt, if a non-maskable interrupt is present;

returning to the interrupt vector register a first vector, if a non-maskable interrupt is not present, and if interrupts are disabled, or if a value in a highest pending interrupt register is less than, or equal to, a value in a highest servicing interrupt register;

sending an interrupt service register bit corresponding to a top-most vector in an interrupt request registers and returning to the interrupt vector register the top-most vector in the interrupt request register, if a non-maskable interrupt is not present, and if a task priority register has not disabled interrupts, and if a value in the highest pending interrupt register is greater than a value in the highest servicing interrupt register.

19. The method of claim 18 wherein returning said first vector returns a spurious vector.

20. The method of claim 18 wherein the triggering the control action initiates a hardware sequence.

21. The method of claim 20 wherein software selectively masks interrupts.

22. The method of claim 20 wherein software selectively sets a priority of an interrupt.

* * * * *